W. R. KENDALL.
INSERTABLE SAW TEETH.
APPLICATION FILED DEC. 4, 1913.
1,141,063.
Patented May 25, 1915.
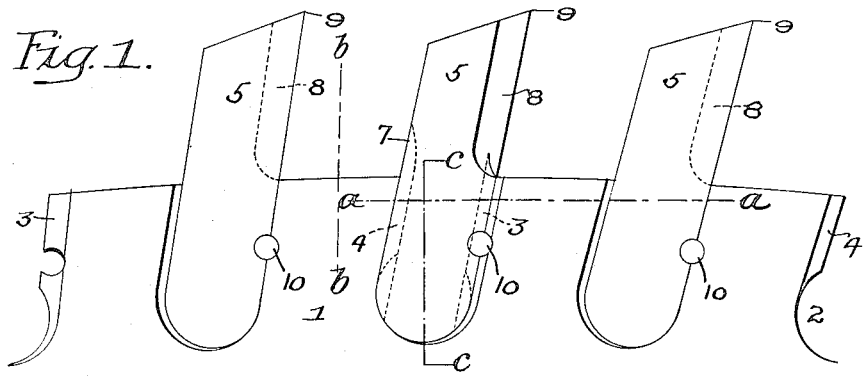
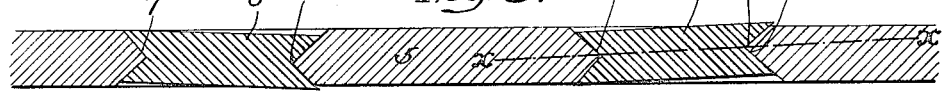
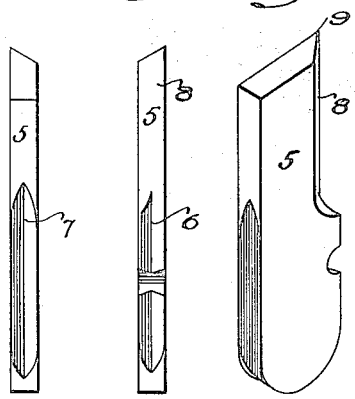
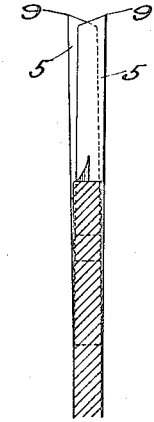
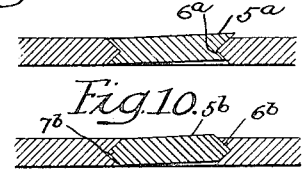
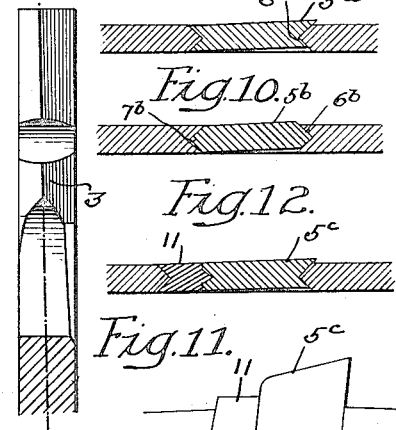
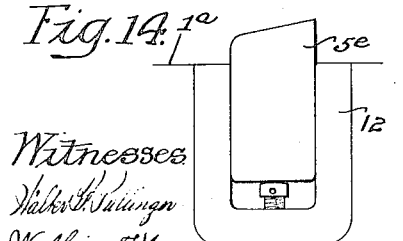
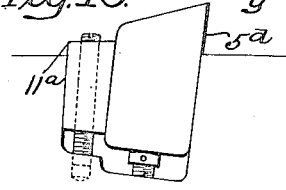
Witnesses
Inventor
William R. Kendall
by his Attorneys,
Howson & Howson

UNITED STATES PATENT OFFICE.

WILLIAM R. KENDALL, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

INSERTIBLE SAW-TEETH.

1,141,063.  Specification of Letters Patent.  Patented May 25, 1915.

Application filed December 4, 1913. Serial No. 804,689.

*To all whom it may concern:*

Be it known that I, WILLIAM R. KENDALL, a citizen of the United States, residing in Philadelphia, Pennsylvania, have invented certain Improvements in Insertible Saw-Teeth, of which the following is a specification.

My invention relates to certain improvements in saws having insertible teeth, the teeth being so set in the blade as to provide the necessary clearance.

One object of my invention is to use flat teeth and to locate them in the sockets in the plate so that the teeth will be offset to the desired extent.

A further object of the invention is to use flat teeth in order to reduce the cost of manufacture.

It will be understood that my invention can be used either as a wood saw or as a metal saw.

In the accompanying drawings: Figure 1 is a side view of a circular wood saw having inserted teeth made in accordance with my invention; Fig. 2 is a plan view; Fig. 3 is a sectional view on the line *a—a*, Fig. 1; Fig. 4 is a transverse sectional view on the line *b—b*, Fig. 1; Fig. 5 is a sectional view through the blade on the line *c—c*, Fig. 1, the tooth being removed; Fig. 6 is a perspective view of one of the teeth illustrated in Fig. 1; Fig. 7 is a front view of said tooth; Fig. 8 is a rear view of the tooth; Figs. 9 and 10 are sectional views of modifications of the means for mounting the teeth in the blade of the saw; Figs. 11 and 12 are views showing one method of holding a tooth in a metal saw; Fig. 13 is a view of another method of holding a tooth; and Fig. 14 is a view showing the invention as applied to a tooth mounted in a holder secured in the blade of the saw.

Referring to the drawings, 1 is the blade having recesses 2. The front wall of each recess in the present instance has a V-shaped rib 3 and the rear wall has a V-shaped rib 4. The rib on the front wall of each recess is located at one side of the center of the blade, as indicated by the line *x—x*, Fig. 3, and both ribs are also inclined as shown by the line *y—y*, Fig. 5, so as to throw the tooth off the center. Thus the cutting edge of a tooth projects beyond one side of the blade which gives the saw the proper set without shaping the teeth. It will be seen that each tooth is made from a flat piece of steel cut into the proper shape.

Each tooth 5 has a V-shaped groove 6 at the forward edge and a V-shaped groove 7 at the rear edge to receive the ribs on the blade. In the present instance, the teeth are alternately beveled at 8 and are slightly inclined at the top to produce the proper cutting edge 9. The ribs, in the present instance, are formed so that alternate teeth project on one side of the blade while the remaining teeth project on the other side of the blade. This arrangement may be modified and where cleaning teeth are used they may be arranged in the mid-position at any point desired.

In the present instance, I have shown rivets 10 extending through the openings formed partly in the front wall of the blade and partly in the teeth, but these rivets may be dispensed with in some instances and the teeth can be driven to make a tight fit and other means of fastening may be used, if found desirable.

In Fig. 9, I have shown the groove $6^a$ in the tooth $5^a$ offset to cause the tooth to project laterally from the surface of the blade instead of offsetting the inclined rib on the blade.

In Fig. 10, I have shown a modification in which the tooth $5^b$ has ribs $6^b$ and $7^b$, which enter corresponding grooves in the blade, and either the grooves or the blades may be offset, as desired.

In Figs. 11 and 12, I have illustrated my invention as applied to a metal saw. The tooth $5^c$ is offset, as in Fig. 1, and is held in place by an inverted wedge 11.

In Fig. 13, I have shown the tooth $5^d$ held in place by a wedge $11^a$ driven in from the periphery of the blade.

In Fig. 14, I have shown the tooth $5^e$ located within a carrier 12 which, in turn, is located in the blade $1^a$ and the carrier and the tooth may be set at an angle with respect to the blade or the carrier may be set at an angle with respect to the blade, producing the same effect, viz, the arrangement of the tooth at an angle with respect to the blade so that a flat tooth can be used and the proper set given to the teeth of the saw.

The construction shown in Fig. 9 forms the subject of a patent granted to me on the fifth day of May, 1914, No. 1,095,883.

I claim:

The combination in a saw, of a blade having a recess therein; a rib on each wall of the recess; a flat tooth having grooves arranged to receive the ribs, the front rib in each recess being offset in respect to the back rib and also arranged at an incline so that the rear portion of a tooth will be flush with both side walls of the blade, while the front or cutting edge of a tooth will project beyond one of the side walls.

In testimony whereof, I have signed my name to this specification, in the presence of two subscribing witnesses.

WILLIAM R. KENDALL.

Witnesses:
W. C. BURKHOLDER,
E. B. ROBERTS.